United States Patent
Cox et al.

(10) Patent No.: US 7,689,870 B2
(45) Date of Patent: Mar. 30, 2010

(54) EFFICIENT AND FLEXIBLE TRACE TRIGGER HANDLING FOR NON-CONCURRENT EVENTS

(75) Inventors: Jason A. Cox, Raleigh, NC (US); Keith A. DeWeese, Cary, NC (US); Robert J. Dorsey, Durham, NC (US); Eric F. Robinson, Raleigh, NC (US); Thuong Q. Truong, Austin, TX (US); Mark J. Wolski, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 11/561,010

(22) Filed: Nov. 17, 2006

(65) Prior Publication Data

US 2008/0120523 A1 May 22, 2008

(51) Int. Cl.
 *G06F 11/00* (2006.01)
(52) U.S. Cl. .......................... 714/45; 714/39
(58) Field of Classification Search ........................ None
 See application file for complete search history.

(56) References Cited

U.S. PATENT DOCUMENTS

| | | | |
|---|---|---|---|
| 6,633,838 B1 * | 10/2003 | Arimilli et al. ................. | 703/16 |
| 6,754,852 B2 * | 6/2004 | Swoboda ....................... | 714/39 |
| 6,834,360 B2 * | 12/2004 | Corti et al. .................... | 714/37 |
| 6,948,098 B2 * | 9/2005 | Pillay et al. ................... | 714/34 |
| 6,961,875 B2 | 11/2005 | Floyd et al. | |
| 7,332,929 B1 * | 2/2008 | Normoyle et al. ............. | 326/16 |
| 2004/0078695 A1 * | 4/2004 | Bowers et al. ................ | 714/39 |
| 2004/0117605 A1 * | 6/2004 | Ahmad et al. ................ | 712/227 |

\* cited by examiner

*Primary Examiner*—Gabriel L Chu
(74) *Attorney, Agent, or Firm*—Cantor Colburn, LLP; James R. Nock (57) ABSTRACT

A method and system for creating trace triggers from non-concurrent events, the system comprising: a trace trigger mechanism including: a plurality of multiplexers for breaking down a plurality of signals into a plurality of groups of signals; a pattern match mechanism for matching the plurality of signals to form a plurality of events, and a trace array trigger control block to perform one or more functions on the plurality of independently controlled events in order to create flexible trace trigger controls from non-concurrent events to control the starting and stopping of a data gathering function such as is used to capture trace data.

13 Claims, 4 Drawing Sheets

EFFICIENT AND FLEXIBLE TRACE TRIGGER HANDLING FOR NON-CONCURRENT EVENTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to debugging processes in microprocessors, and particularly to a method for creating trace triggers from non-concurrent events.

2. Description of Background

When signals within a microprocessor chip (or other logic) are not properly driven, the microprocessor does not behave correctly. The debugging process (i.e., finding and fixing the problem) becomes simpler when the signals in the chip can be observed. To make this possible, trace mechanisms are implemented to record events that occur on these internal signals. However, trace mechanisms can only capture a limited amount of information. Once a trace buffer is full, additional information may not be recorded without overwriting older information. Trigger mechanisms are usually added to give more control over when events get recorded.

Triggers are programmed to look for specific events of interest, such as a signal or a pattern on a bus. When a desired event is found, the trigger activates, telling the trace mechanism to either start or stop recording. Conventional triggers watch for a combination of concurrent events, leaving limited flexibility in defining trigger events. An inherent limitation of existing solutions is that this concurrent nature prevents triggering off of multiple events that reach the triggers in sequential order. Designers have to make sure signals used to form an event reach the trigger mechanism simultaneously. To do this, components referred to as staging latches are added in order to delay signals so they arrive at the trigger mechanism concurrently. For instance, if half of an address gets to the trigger mechanism a cycle before the other half, the designer would have to delay the first half with staging latches so that the trigger could observe the entire address simultaneously. These staging latches add power and area, and rigidly define the concurrent signal relationships that define events.

Considering the limitations of the above-mentioned trigger mechanisms, it is desirable, therefore, to formulate a highly flexible method and apparatus for creating trace triggers from non-concurrent events while reducing the need for staging latches.

SUMMARY OF THE INVENTION

The shortcomings of the prior art are overcome and additional advantages are provided through the provision of a method for creating trace triggers from non-concurrent events, the method comprising: inputting one or more groups of signals; selecting a group of signals from the one or more groups of signals for each of one or more event handlers; comparing a selected set of signals from each of the group of signals for each of the one or more event handlers against that event handler's predetermined pattern; determining if a match event has occurred for the event handler in the current cycle when a value of the selected set of signals matches a predetermined pattern; allowing detection of the match event to be captured and held; allowing the value of the current cycle's match event to be passed down through a series of cycle delay blocks; capturing a history of values of the match event for as many stages as is desired; examining the value of the held match event, the current cycle's event, and values of each stage of previously captured events in combination with whether each of the held, current, or staged events is enabled by a user to set a trigger to create a summary event for an event handler from the one or more event handlers; allowing for each of the one or more event handlers summary event to be disabled or enabled by the user for use in forming a collective trigger; and examining results of each of the enabled event handlers of the one or more event handlers; wherein if the value from each of the enabled event handlers of the one or more event handlers is asserted, a triggering mechanism is enabled.

The shortcomings of the prior art are overcome and additional advantages are provided through the provision of a system for creating trace triggers from non-concurrent events, the system comprising: a trace trigger mechanism including: a plurality of multiplexers for breaking down a plurality of signals into a plurality of groups of signals; a pattern match mechanism for matching the plurality of signals to form a plurality of events; and a trace array trigger control block to perform one or more functions on the plurality of independently controlled events in order to create flexible trace trigger controls from non-concurrent events to control the starting and stopping of a data gathering function such as is used to capture trace data.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method and apparatus for creating trace triggers from non-concurrent events while reducing the need for staging latches.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a method for creating trace triggers from non-concurrent events while reducing the need for staging latches. In another aspect of the exemplary embodiments of the present invention, a method and apparatus for breaking down the signals that may form triggers into groups of signals that are active relative to each other in the same cycle is provided. These patterns are then matched to form events and the trace array trigger control block is set up to perform a Boolean function (e.g., an AND or an OR function) on the events. The exemplary embodiments further allow signals to be combined through time by piping down the individual events and only evaluating relevant events at an appropriate time.

Figure 1:
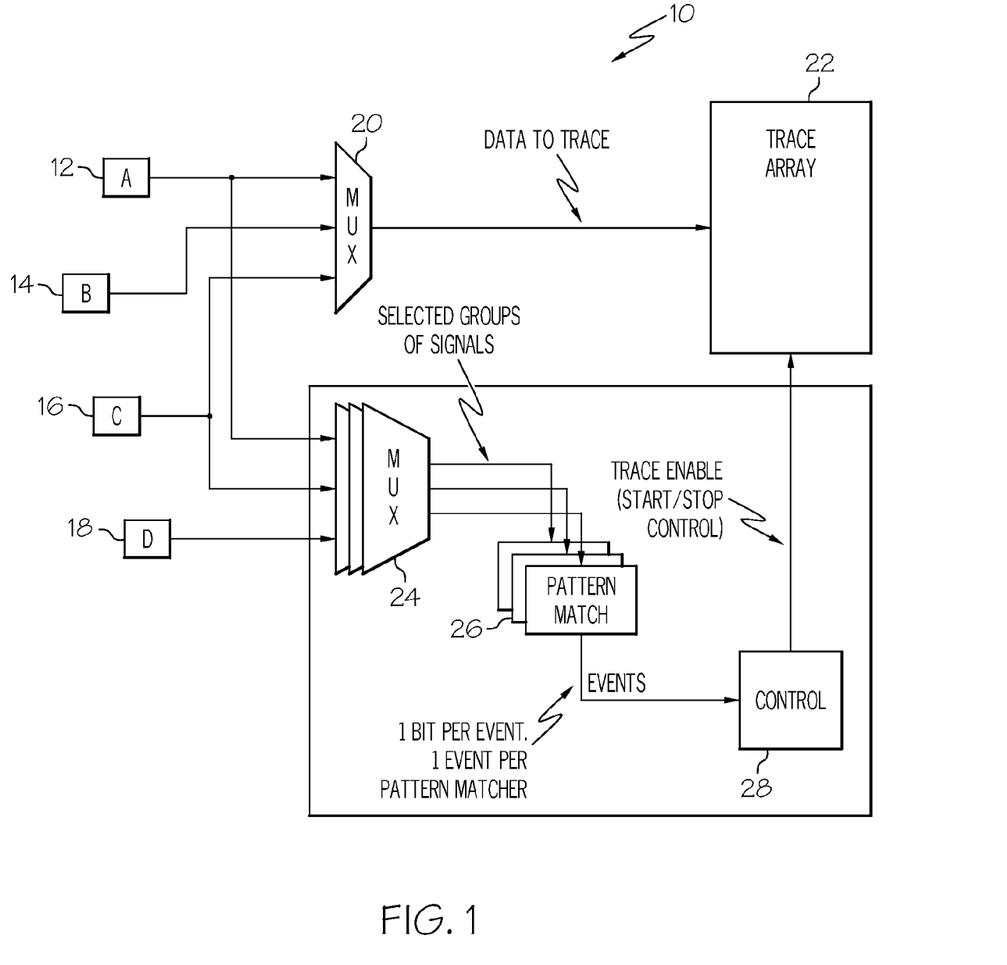
FIG. 1 is a schematic diagram illustrating one example of a system having a trace trigger mechanism.

Referring to FIG. 1, one example of a system having a trace trigger mechanism is illustrated. The system 10 includes logic block A (12), logic block B (14), logic block C (16), and logic block D (18). Logic blocks 12, 14, 16, and 18 represent logical entities whose outputs include signals that are deemed valuable to send to a trace array or to trigger a trace action in order to effectively debug a system. Signals from logic blocks A 12 and C 16 are provided to trace data multiplexer 20 and a plurality of trace trigger multiplexers 24. Signals from logic block B 14 are provided to trace data multiplexer 20. Logic block D 18 sends signals to a plurality of trace trigger multiplexers 24. The output of the trace data multiplexer 20 is provided to a trace array 22. The output of the trace data multiplexer 20 includes the signals that are desired to be traced. The output of each of the plurality of trace trigger multiplexers 24 is provided to a corresponding pattern match block 26. The output of each of the plurality of trace trigger multiplexers 24 is a selected group of signals. After each of the selected group of signals is processed by its corresponding pattern match block 26, an event signal that carries the status of an event match is outputted and provided to a trigger control 28. Each of the plurality of pattern matchers in the pattern match block 26 sends an event signal to the trigger control 28. The output of the trigger control 28 is provided to the trace array 22 to control the starting and stopping of the trace function.

Figure 2:
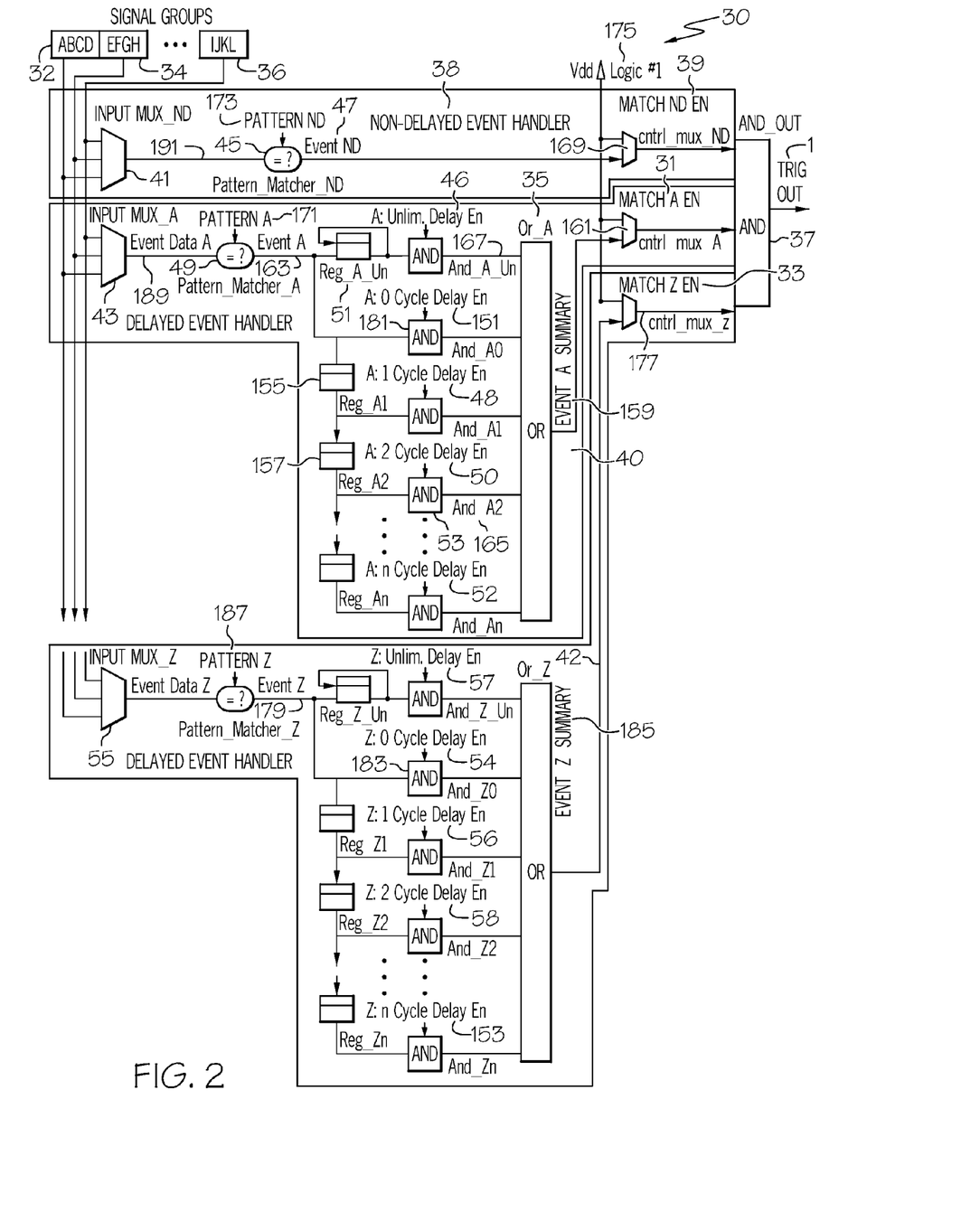
FIG. 2 is a schematic diagram illustrating the trace trigger muxes, pattern match blocks, and a control portion of FIG. 1, according to the exemplary embodiments of the present invention.

Referring to FIG. 2, one example of a system diagram showing a trace trigger mechanism according to the exemplary embodiments of the present invention is illustrated. The system 30, which depicts the triggering mechanism, has an input of one or more groups of signals. In one exemplary embodiment, signals used to form triggers include: signal group ABCD 32, signal group EFGH 34, and signal group IJKL 36. The system 30 includes three event handlers. In one exemplary embodiment, the event handlers are a non-delayed event handler 38, a first delayed event handler 40 (also referred to as "Delayed Event Handler A"), and a second delayed event handler 42 (also referred to as "Delayed Event Handler Z"). The three event handlers 38, 40, and 42 provide their output signal to a logic circuit, represented in this diagram as "And_Out" 37. The signal group ABCD 32, signal group EFGH 34, and signal group IJKL 36 are inputted into the multiplexers "Input_Mux_ND" 41, "Input_Mux_A" 43, and "Input_Mux_Z" 55.

The non-delayed event handler 38 includes at least signal "Match ND EN" 39. The first delayed event handler 40 includes at least signals "Match A En" 31, "A: Unlim. Delay En" 46, "A: 0 Cycle Delay En" 151, "A: 1 Cycle Delay En" 48, "A: 2 Cycle Delay En" 50, and "A: n Cycle Delay En" 52, where "n" is chosen by the implementer and represents the depth of the registers used in the delayed event handlers to achieve the maximum desired separation of known delay cycles between events used to form a single trigger. The second delayed event handler 42 includes at least signals "Match Z En" 33, "Z: Unlim. Delay En" 57, "Z: 0 Cycle Delay En" 54, "Z: 1 Cycle Delay En" 56, "Z: 2 Cycle Delay En" 58, and "Z: n Cycle Delay En" 153.

The entire set of incoming signals is broken down into groups of signals that can be individually pattern matched. Each group of signals is passed through multiplexers (e.g., "Input_Mux_ND" 41, "Input_Mux_A" 43, etc.) that allow any group of signals to go to any or all pattern matchers (e.g., "Pattern_Matcher_ND" 45, "Pattern_Matcher_A" 49, etc.). The output of the non-delayed pattern matcher "Pattern_Matcher_ND" 45, the signal "Event ND" 47, is not connected to any staging latches. It is used for the last event in a series of events that form a single trigger. The rest of the pattern matchers are connected to staging latches and can therefore be used to set up delays relative to each other, and to "Event ND" 47. Each delayed event handler includes a non-delayed version of its detected event (i.e. "Event A" 163 and "Event Z" 179) that is available through an AND block (i.e. "And_A0" 181 and "And_Z0" 183) controlled by a zero cycle enable (i.e. "A: 0 Cycle Delay En" 151 and "Z: 0 Cycle Delay En" 54) feeding its OR block. This path allows events that are concurrent with "Event_ND" 47 to be combined with events from other delayed event handlers that are not concurrent with "Event ND" 47 to form a single trigger.

The usage of each of the stages of the delayed event handlers 40, 42 are controlled using the enables, such as "A: 2 Cycle Delay En" 50. Enabling this "AND gate" 53 allows an event that has passed through a second staging latch, "Reg_A2" 157, to be sent via signal "And_A2" 165 to Or_A 35, whose output signal, "Event_A_Summary" 159 is sent to "Ctrl_Mux_A" 161, which is controlled by "Match A En" 31. Each event handler can have multiple enables set up to control when its current cycle's event or one or more delayed stages of a previous event are sent to its OR block. If both the two cycle delay enable and the four cycle delay enable are set for "Delayed Event Handler A" 40, the delayed event is sent through the logic to Ctrl_Mux_A 161 after two cycles, and again after four. Also, when "Pattern_Matcher_A" 49 detects "Event A" 163, it sets "Reg_A-Un" 51 where it is held until it is reset. If the enable for unlimited delay ("A: Unlim. Delay En" 46) is set and the output of "Reg_A-Un" 51 is set, the event is sent via signal "And_A-Un" 167 to "Or_A" 35 and thus, to "Ctrl_Mux_A" 161 every cycle after it initially occurs. "Reg_A-Un" 51 is reset when "Trig Out" 1 is set.

The non-delayed event handler 38, the first delayed event handler 40, and the second delayed event handler 42 work together to allow triggering off of multiple sequential events. The non-delayed event handler 38 is only instantiated once, while the delayed event handlers 40, 42 can be instantiated multiple times, determined by the maximum number of events desired to form a single trigger. Each event handler's 38, 40, 42 control multiplexer ("Ctrl_Mux_ND" 169, "Ctrl_Mux_A" 161, etc.) is controlled by an enable ("Match_ND_En" 39, "Match_A_En" 31, etc.), which controls whether it uses the summary event ("Event_ND" 47, "Event_A_Summary" 159, etc.) from the event handler or uses a non-controlling (always active) signal to the trigger control block, "And_Out" 37. When an event is disabled, a multiplexer sends a non-controlling signal so that the disabled event does not interfere with the trigger formed by the events of interest. In the exemplary embodiment, for "Delayed Event Handler Z" 42, this is achieved by setting "Match Z En" 33 to a value that passes the Vdd (logic "1") 175 signal through "Ctrl_Mux_Z" 177, since a logic "1" value is non-controlling at an AND gate. Each event can be enabled or disabled independently, and when the "And_Out" 37 observes that all of the enabled events are active, "Trig Out" 1 is set. Therefore, through an examination and understanding of FIG. 2, it can be seen that this invention allows triggering off of one or more events with the same or different patterns, on the same or different groups of signals, on the same or different cycles.

As a first example, if the trigger value of signal group ABCD 32 and the trigger value of signal group EFGH 34 occur at different functional times and arrive at the triggering mechanism 30 at different times, the triggering mechanism 30 of the exemplary embodiments can combine these events to form a single trigger. As a second example, if the trigger value of signal group ABCD 32 and the trigger value of signal group EFGH 34 occur at the same functional time, but signal group ABCD 32 has two extra cycles of latency in arriving at the triggering mechanism 30 relative to signal group EFGH 34, the triggering mechanism 30 of the exemplary embodiments divide this occurrence into two events that form a single trigger. This mechanism of dividing occurrences into events reduces staging latches due to non-concurrent arrival of signals relative to each other at the triggering mechanism 30. Non-concurrent arrival at the trigger mechanism 30 can be due to differences in functional cycles of signal assertion, latency differences due to travel distance to the triggering mechanism, or a combination of these. If a group of signals does not arrive at the triggering mechanism 30 all together at the same time (concurrently), it can be broken down into different events and triggered off of as a whole (a combination of concurrent and/or non-concurrent events). In other words, the exemplary embodiments are staging down the event instead of the input signals to the trigger. In the second example, the exemplary embodiments save staging latches over the alternative of delaying the signal group EFGH 34 by two cycles, using two register bits instead of two times the width of the signal group EFGH 34. This invention also offers a significant extension of triggering capabilities in that signal relationships to form triggers are not limited to a fixed set that are pre-determined and pre-built in the hardware to arrive concurrently at the triggering mechanism. Instead, triggers are programmatically controlled using a combination of the non-delayed and delayed event handlers to achieve nearly any compound signal relationship to form a trigger, including the capability of setting up a signal relationship of an unknown delay.

The following example illustrates triggering off of multiple signals separated in time by unknown delays. For instance, in FIG. 2, if an event on signal group ABCD 32 occurs any time after an event on signal group EFGH 34, the triggering mechanism 30 of the exemplary embodiments can combine these events to form a single trigger. To accomplish this, signal group ABCD 32 would use the non-delayed event handler 38 since it is the last event of interest that collectively forms the trigger, and signal group EFGH 34 would use a first delayed event handler 40. The following steps, in no particular order, would need to be done to form the trigger: set up "Pattern_Matcher_ND" 45 to look for the trigger value (Pattern ND" 173) for signal group ABCD 32; set "Match ND En" 39 to select "Event ND" 47; set up "Pattern_Matcher_A" 49 to look for the trigger value ("Pattern A" 171) for signal group EFGH 34; set "A:Unlim. Delay En" 46 to allow "Delayed Event_Handler_A" 40 to present to Ctrl_Mux_A 161 that "Event_A" 163 has occurred at least once, at some time, since its occurrence will set "Reg_A-Un" 51, whose set value will hold, as seen by the feedback path, until it is reset; set "Match_A En" 31 to select "Event_A_Summary" 159; disable "Match Z En" 33 to select "Vdd (logic '1')" 175 instead of "Event_Z_Summary" 185, which is unused in this example, to set up the remaining inputs to the trigger control block, "And_Out" 37. Once "Pattern_Matcher_A" 49 detects the trigger value for signal group EFGH 34, it sets "Reg_A-Un" 51. Each cycle, because "A:Unlim. Delay En" 46 is set and "Match A En" 31 is set, the trigger control block, "And_Out" 37 is told that "Event A" 163 has occurred. Each cycle, because "Match Z En" 33 is disabled, a non-controlling value is presented through "Ctrl_Mux_Z" 177 to the trigger control block, "And_Out" 37. Once "Pattern_Matcher_ND" 45 detects the trigger value for signal group ABCD 32, it sets "Event_ND" 47 which is passed thru "Ctrl_Mux_ND" 169 to the trigger control block, "And_Out" 37 because "Match ND En" 39 is set. When the trigger control block, "And_Out" 37 sees the outputs of "Ctrl_Mux_ND" 169, "Ctrl_Mux_A" 161, and "Ctrl_Mux_Z" 177 all active at the same time, it activates the trigger, "Trig_Out" 1.

The following example illustrates triggering off of multiple signals separated in time by known and unknown delays. For instance, in FIG. 2, the trigger mechanism of the exemplary embodiments can watch for an event to happen on signal group ABCD 32, then, some unknown time afterwards, two events to happen on signal group EFGH 34 and signal group IJKL 36 separated by two cycles, and these events can combine to form a single trigger. To configure the trigger for this example, set up "Delayed Event Handler A" 40 to watch for the trigger value ("Pattern A" 171) for signal group ABCD 32, to enable unlimited delay by setting "A: Unlim. Delay En" 46, and to allow "Event_A_Summary" 159 to go through "Ctrl_Mux_A" 161 by setting "Match A En" 31; set up "Delayed Event Handler Z" 42 to watch for the trigger value ("Pattern Z" 187) for signal group EFGH 34, to enable a two cycle delay by setting "Z: 2 Cycle Delay En" 58, and to allow "Event_Z_Summary" 185 to go through "Ctrl_Mux_Z" 177 by setting "Match Z En" 33; set up "Non-Delayed Event Handler" 38 to watch for the trigger value ("Pattern ND" 173) for signal group IJKL 36, and to allow "Event_ND" 47 to go through "Ctrl_Mux_ND" 169 by setting "Match ND En" 39. The trigger will fire when the trigger value for signal group IJKL 36 is seen two cycles after the trigger value for signal group EFGH 34 is seen, some time after the trigger value for signal group ABCD 32 is seen.

The following examples illustrate pattern matching the same signals occurring at different times. Multiple pattern matchers can be set to look at the same signals for the same patterns or for different patterns, separated by a known or unknown number of cycles. For example, we can use a single input group to detect the same pattern occurring on that input group at different times. In FIG. 2, this is achieved by sending input signal group ABCD 32 to both the non-delayed event handler 38 and to a first delayed event handler 40, and pattern matching on the same pattern separated by known or unknown delays to form a single trigger. Another example is to use a single input group to detect different patterns on that input group at different times. This is achieved by sending signals ABCD 32 to both the non-delayed event handler 38 and to a first delayed event handler 40, and pattern matching on different patterns separated by known or unknown delays to form a single trigger.

The following example illustrates matching multiple patterns when one pattern occurs x, y, or z cycles after other patterns. For instance, in FIG. 2, if the trigger value for signal group ABCD 32 and the trigger value for signal group EFGH 34 occur at different times and arrive at the triggering mechanism 30 at different times, the triggering mechanism 30 of the exemplary embodiments can watch to determine if these events occur with either 3 or 5 or 10 cycles between them. This is achieved by setting the appropriate delay enables (e.g., 3, 5, 10) in a first delayed event handler 40 for the event which occurs first, setting up the non-delayed event handler 38 to detect the event which occurs last, and providing the controls that allow combining these to form a single trigger.

Figure 3:
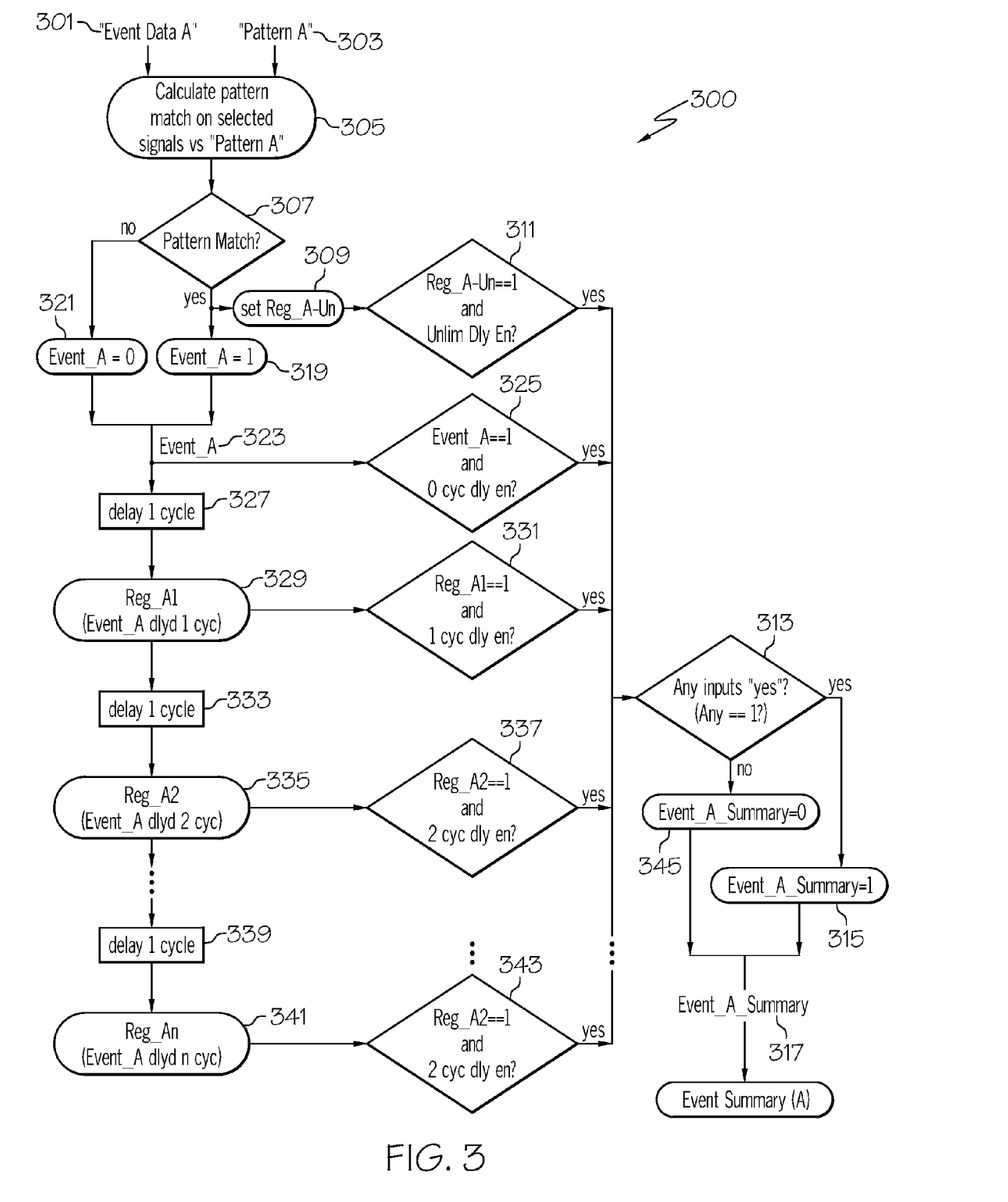
FIG. 3 is a flowchart illustrating the Delayed Event Handler (shown in FIG. 2), according to the exemplary embodiments of the present invention.

Referring to FIG. 3, one example of a flowchart illustrating the Delayed Event Handler (shown as item 40 in FIG. 2), according to the exemplary embodiments of the present invention is illustrated. The flowchart 300 commences at step 305 where "Event Data A" 301 (shown as signal 189 in FIG. 2) is provided to the system 30, shown in FIG. 2. In step 305, the pattern match on selected signals of "Event Data A" 301 versus "Pattern A" 303 is calculated. In step 307, it is determined whether a match is detected. If a match is not detected, the process flows to step 321 and "Event_A" is assigned a value of 0. If a match is detected, then the process flows to steps 319 and 309. In step 319, "Event_A" is assigned a value of 1. In step 309, "Reg_A-Un" is set. "Reg_A-Un" is the unlimited delay register. Once set, it remains set until it is reset by the occurrence of a fully realized trigger event, represented by "Trig_Out" 439 of FIG. 4. The process flows from step 309 to step 311 where it is determined whether the register "Reg_A-Un" is set to 1 AND the unlimited delay is enabled. If "Reg_A-Un is not set to 1 or the unlimited delay is not enabled, then this leg of the flow does not play a role in the formation of a trigger event in this cycle. If "Reg_A-Un" is set to 1 AND the unlimited delay is enabled, the process flows to step 313, which essentially functions like a logical OR block for a plurality of inputs. In step 313, it is determined whether any of the plurality of inputs into it is a "yes", or is set to a logical "1". The presence of the "yes" or logical "1" value out of step 311, or any of the plurality of other steps feeding into it, causes "Event_A_Summary" to be set to 1, as indicated in step 315. If none of the plurality of inputs feeding into step 313 is a "yes" or logical "1", then the flow proceeds to step 345, in which "Event_Summary_A" is set to a 0. The "Event_A_Summary" 317 value will then be made available to additional trigger formation logic, as shown in input 423 in FIG. 4.

The value of "Event_A" 323 is determined by whether a pattern match is detected in step 307, with the value determined by the resulting path taken through step 319 or step 321. Once the value of "Event_A" is determined, the process flows to steps 325 and 327. In step 325, it is determined whether the value of "Event_A" is set to 1 AND the "0 cycle" delay is enabled. If "Event_A is not set to 1 or the "0 cycle" delay is not enabled, then this leg of the flow does not play a role in the formation of a trigger event in this cycle. If "Event_A" is set to 1 AND the "0 cycle" delay is enabled, the process flows to step 313 and onward through step 315, in which "Event_A_Summary" will be set to a value of 1 and sent as the signal "Event_A_Summary" 317 to additional trigger formation logic.

In step 327, "Event_A" 323 is sent to the first in a series of a plurality of delay, storage, and logic elements, that are designed to stage the occurrence of the event through a number of cycles determined by the depth of the stages designed into the system by the system designer, represented by the italicized n in steps 341 and 343 of FIG. 3, enabled at the appropriate stage or stages by the needs of this component of the trigger. The operation at each stage is as follows. In the first stage, step 327 delays "Event_A" 323 for a cycle, and the value is stored in "Reg_A1" 329, which is a storage element, or register, which contains the value of "Event_A" 323 one cycle after its value was determined from the Pattern Match of step 307 through either step 321 or step 319. The process flows from step 329 to step 331 for further processing in this stage, and to step 333 for the next stage. In step 331 it is determined whether the value of "Reg_A1" 329 is set to 1 AND the "1 cycle delay" is enabled. If "Reg_A1" 329 is not set to 1 or the "1 cycle delay" is not enabled, then this leg of the flow does not play a role in the formation of a trigger event in this cycle. If "Reg_A1" 329 is set to 1 AND the "1 cycle delay" is enabled, the process flows to step 313 and onward through step 315, in which "Event_A_Summary" will be set to a value of 1, and sent as the signal "Event_A_Summary" 317 to additional trigger formation logic. In the second stage, step 333 delays the output of "Reg_A1" 329 for a cycle, and the value is stored in "Reg_A2" 335, which is a storage element, or register, which contains the value of "Event_A" 323 two cycles after its value was determined from the Pattern Match of step 307, through either step 321 or step 319. The process flows from step 335 to step 337 for further processing in this stage, and to the next stage. In step 337 it is determined whether the value of "Reg_A2" 335 is set to 1 AND the "2 cycle delay" is enabled. If "Reg_A2" 335 is not set to 1 or the "2 cycle delay" is not enabled, then this leg of the flow does not play a role in the formation of a trigger event in this cycle. If "Reg_A2" 335 is set to 1 AND the "2 cycle delay" is enabled, the process flows to step 313 and onward through step 315, in which "Event_A_Summary" will be set to a value of 1, and sent as the signal "Event_A_Summary" 317 to additional trigger formation logic.

Subsequent stages will operate in the same manner until the last stage, represented in FIG. 3 by elements 339, 341, and 343. In step 339, the output of the previous stage's register is delayed for a cycle, and the value is stored in "Reg_An" 341, which is a storage element, or register, which contains the value of "Event_A" 323 n cycles after its value was determined from the Pattern Match of step 307, through either step 321 or step 319. The process flows from step 341 to step 343, in which it is determined whether the value of "Reg_An" 341 is set to 1 AND the "n cycle delay" is enabled. If "Reg_An" 341 is not set to 1 or the "n cycle delay" is not enabled, then this leg of the flow does not play a role in the formation of a trigger event in this cycle. If "Reg_An" 341 is set to 1 AND the "n cycle delay" is enabled, the process flows to step 313 and onward through step 315, in which "Event_A_Summary" will be set to a value of 1. If none of the plurality of inputs feeding into step 313 is a "yes" or logical "1", the flow proceeds to step 345, in which "Event_Summary_A" is set to a 0. The signal "Event_A_Summary" 317 is then sent to additional trigger formation logic, as shown in input 423 in FIG. 4.

Figure 4:
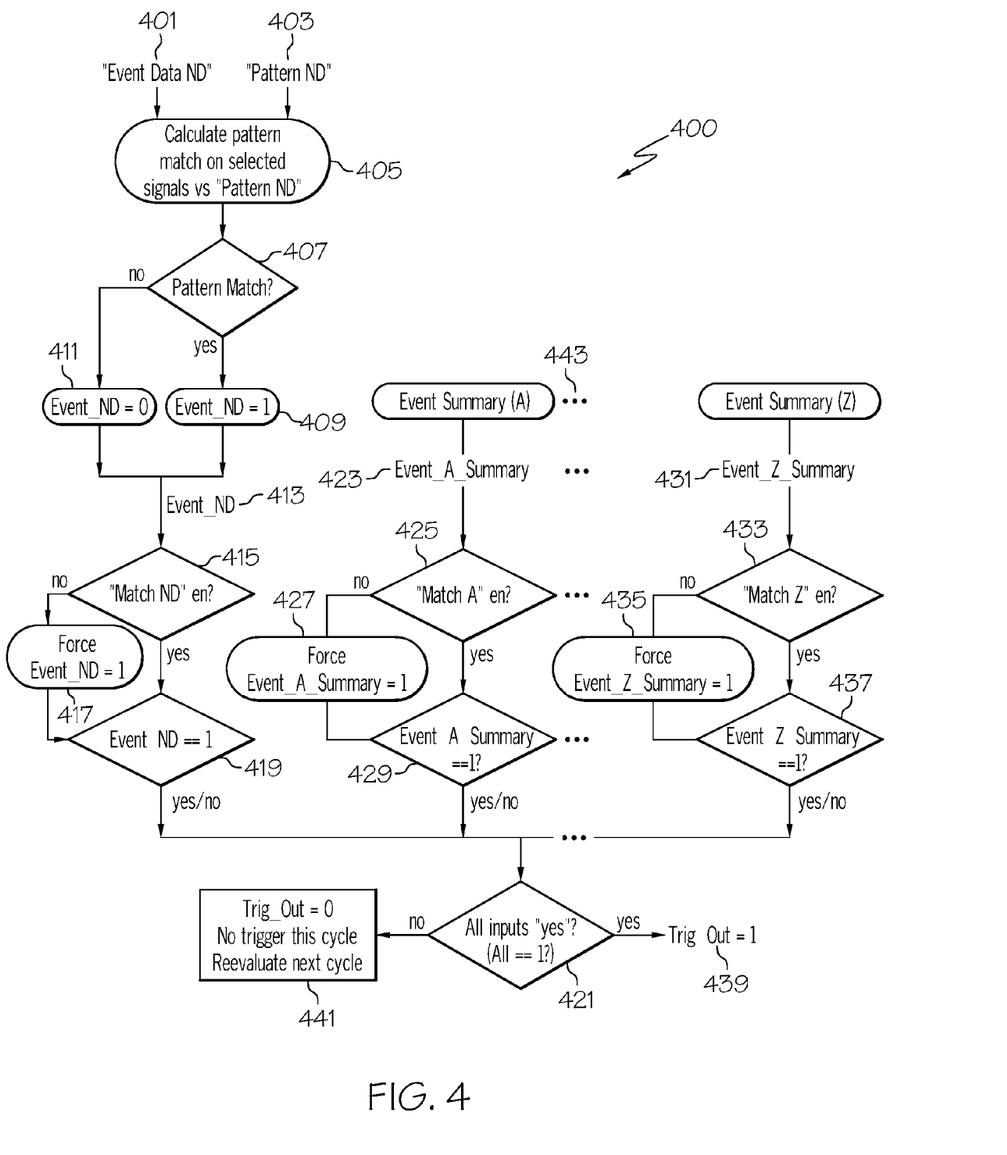
FIG. 4 is a flowchart illustrating how the Event Handlers are combined to form a single trigger, according to the exemplary embodiments of the present invention.

Referring to FIG. 4, one example of a flowchart illustrating how the Event Handlers are combined to form a single trigger, according to the exemplary embodiments of the present invention is illustrated. The flowchart 400 commences at step 405 where "Event Data ND" 401 (shown as signal 191 in FIG. 2) is provided to the system 30, shown in FIG. 2. Steps 405 through 413 determine whether or not a non-delayed event, "Event_ND" has been detected, as follows. In step 405, the pattern match on selected signals of "Event Data ND" 401 versus "Pattern ND" 403 is calculated. In step 407, it is determined whether a match is detected. If a match is not detected, the process flows to step 411 and "Event_ND" is assigned a value of 0. If a match is detected, then the process flows to step 409 and "Event_ND" is assigned a value of 1. The value of "Event_ND" 413 is then presented to the remainder of the process flow.

At this point, the value of "Event_ND" 413 (the non-delayed event handler output), "Event_A_Summary" 423 (shown as 317 in FIG. 3, and representing the output of a first delayed event handler), and "Event_Z_Summary" 431 (representing the last of a plurality of delayed event handlers, each following the example of FIG. 3) are each presented to one representation of the final stages of the trigger formation logic. At this point, it will be determined how the output of each of the event handlers is used to form the aggregate trigger. The basic steps are as follows: Each event handler's "Match Enable" value is examined to determine if the event handler's output will be used in the calculation of the aggregate trigger. If it is enabled, the event handler's output value is passed to the final stage of the trigger formation logic. If it is not enabled, the event handler's value is forced to a non-controlling value so that it will allow the enabled event handler outputs to control the trigger formation. In one exemplary embodiment, a trigger is asserted when the final stage requires that all its inputs are a logic "1", such as a logical AND function. In this representation, all disabled event handlers will be forced to a non-controlling value of logic "1" and the aggregate trigger will be asserted when the enabled event handlers are all at a logic "1". As long as any enabled event handler's output is not asserted, the trigger will not be created.

The process for the non-delayed event handler's output flows to step 415. In step 415, it is determined whether "Match_ND" is enabled. If "Match_ND" is not enabled, the process flows to step 417 where "Event_ND" is forced to a non-controlling value of logic "1" and the process flows to step 419. If "Match ND" is enabled, "Event_ND" retains its output value from the event handler and the process flows directly to step 419. In step 419, it is determined whether "Event_ND" is set to 1. If "Event_ND" is set to 1, the process flows to step 421 with a "yes". If "Event_ND" is not set to 1 (it is a 0), the process flows to step 421 with a "no". In step 421, it is determined whether all the inputs to this step are set to 1 ("yes"). If all the inputs are set to 1, the process ends with a trigger and "Trig_Out" 439 is set to 1. If it is not the case that all of the inputs are set to 1, the process flows to step 441 and there is no trigger this cycle. In step 441, "Trig_Out" remains a 0, and the process is allowed to evaluate again in the next cycle.

The process for each delayed event handler's output is handled in the same manner as the non-delayed event handler's output. In step 425, it is determined whether "Match_A" is enabled. If "Match_A" is not enabled, the process flows to step 427 where "Event_A_Summary" is forced to a non-controlling value of logic "1" and the process flows to step 429. If "Match A" is enabled, "Event_A_Summary" retains its output value from the event handler and the process flows directly to step 429. In step 429, it is determined whether "Event_A_Summary" is set to 1. If "Event_A_Summary" is set to 1, the process flows to step 421 with a "yes". If "Event_A_Summary" is not set to 1 (it is a 0), the process flows to step 421 with a "no". The " . . . " symbols 443 in FIG. 4 represents a plurality of process flows for all other event handlers up to the last delayed event handler which is represented as having the output "Event_Z_Summary".

In step 433, it is determined whether "Match_Z" is enabled. If "Match_Z" is not enabled, the process flows to step 435 where "Event_Z_Summary" is forced to a non-controlling value of logic "1" and the process flows to step 437. If "Match Z" is enabled, "Event_Z_Summary" retains its output value from the event handler and the process flows directly to step 437. In step 437, it is determined whether "Event_Z_Summary" is set to 1. If "Event_Z_Summary" is set to 1, the process flows to step 421 with a "yes". If "Event_Z_Summary" is not set to 1 (it is a 0), the process flows to step 421 with a "no". In step 421, it is determined whether all the inputs to this step are set to 1 ("yes"). If all the inputs are set to 1, the process ends with a trigger and "Trig_Out" 439 is set to 1. If it is not the case that all of the inputs are set to 1, the process flows to step 441 and there is no trigger this cycle. In step 441, "Trig_Out" remains a 0, and the process is allowed to evaluate again in the next cycle.

As a result, the exemplary embodiments of the present invention allow for a significant improvement of trace triggering capabilities. The exemplary embodiments overcome the limitations imposed by a fixed, and therefore limited, set of pre-determined signal relationships embedded in the hardware in a way to force concurrency at the triggering mechanism, and instead make it possible to find any event followed by the same or different events some time later without necessitating concurrency at the triggering mechanism. This gives vastly more control over when internal signals are recorded in the trace buffer, enabling faster and more thorough discovery of the cause of a potential logic error. The exemplary embodiments also reduce the need for staging latches to achieve concurrency at the triggering mechanism through cycle alignment of signals that form the trigger events.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for creating trace triggers from non-concurrent events, the method comprising:
inputting one or more groups of signals generated by logic blocks residing within an electronic system;
selecting a group of signals from the one or more groups of signals for each of one or more event handlers;
comparing a selected set of signals from each of the group of signals for each of the one or more event handlers against that event handler's predetermined pattern;
determining if a match event has occurred for the event handler in the current cycle when a value of the selected set of signals matches a predetermined pattern;
allowing detection of the match event to be captured and held;

allowing the value of the current cycle's match event to be passed down through a series of cycle delay blocks;

capturing a history of values of the match event for as many stages as is desired;

examining the value of the held match event, the current cycle's match event, and values of each stage of previously captured events in combination with whether each of the held, current, or staged events is enabled by a user to set a trigger to create a summary event for an event handler from the one or more event handlers;

allowing for each of the one or more event handlers' summary event to be disabled or enabled by the user for use in forming a collective trigger; and examining results of each of the enabled event handlers' summary event of the one or more event handlers;

wherein if the value from each of the enabled event handlers' summary event of the one or more event handlers is asserted, a triggering mechanism is enabled for controlling the starting and stopping of a data gathering function for capturing trace data within the electronic system.

2. The method of claim 1, wherein the triggering mechanism combines a plurality of events to form a single trigger when the plurality of events have different latencies in traveling to the triggering mechanism.

3. The method of claim 1, wherein the triggering mechanism divides the one or more groups of signals into multiple events to form a single trigger when the one or more groups of signals travel to the triggering mechanism with the same latency, but occur in different cycles.

4. The method of claim 1, wherein the triggering mechanism triggers on the one or more groups of signals separated in time by unknown delays.

5. The method of claim 1, wherein the triggering mechanism triggers on the one or more groups of signals separated in time by both known and unknown delays.

6. The method of claim 1, wherein the triggering mechanism matches the same pattern at different time intervals occurring on the same one or more groups of signals.

7. The method of claim 1, wherein the triggering mechanism matches different patterns in different cycles occurring on the same one or more groups of signals.

8. A computer program product for trace triggers from non-concurrent events, the computer program product comprising:

a storage medium readable by a processing circuit and storing instructions for execution by the processing circuit for facilitating a method comprising:

inputting one or more groups of signals generated by logic blocks residing within an electronic system;

selecting a group of signals from the one or more groups of signals for each of one or more event handlers;

comparing a selected set of signals from each of the group of signals for each of the one or more event handlers against that event handler's predetermined pattern;

determining if a match event has occurred for the event handler in the current cycle when a value of the selected set of signals matches a predetermined pattern;

allowing detection of the match event to be captured and held;

allowing the value of the current cycle's match event to be passed down through a series of cycle delay blocks;

capturing a history of values of the match event for as many stages as is desired;

examining the value of the held match event, the current cycle's match event, and values of each stage of previously captured events in combination with whether each of the held, current, or staged events is enabled by a user to set a trigger to create a summary event for an event handler from the one or more event handlers;

allowing for each of the one or more event handlers' summary event to be disabled or enabled by the user for use in forming a collective trigger; and examining results of each of the enabled event handlers' summary event of the one or more event handlers;

wherein if the value from each of the enabled event handlers' summary event of the one or more event handlers is asserted, a triggering mechanism is enabled for controlling the starting and stopping of a data gathering function for capturing trace data within the electronic system.

9. The computer program product of claim 8, wherein the triggering mechanism combines a plurality of events to form a single trigger when the one or more events have different latencies in traveling to the triggering mechanism.

10. The computer program product of claim 8, wherein the triggering mechanism divides the one or more groups of signals into multiple events to form a single trigger when the one or more groups of signals travel to the triggering mechanism with the same latency, but occur in different cycles.

11. The computer program product of claim 8, wherein the triggering mechanism triggers on the one or more groups of signals separated in time by unknown delays or by both known and unknown delays.

12. The computer program product of claim 8, wherein the triggering mechanism matches the same pattern at different time intervals occurring on the same one or more groups of signals.

13. The computer program product of claim 8, wherein the triggering mechanism matches different patterns in different cycles occurring on the same one or more groups of signals.

* * * * *